(12) United States Patent
Peng et al.

(10) Patent No.: US 12,148,270 B1
(45) Date of Patent: Nov. 19, 2024

(54) MICROELECTROMECHANICAL SYSTEM SENSORS FOR ATM INFORMATION SECURITY

(71) Applicant: Bank of America Corporation, Charlotte, NC (US)

(72) Inventors: Yingcai Peng, Charlotte, NC (US); Maneesh Kumar Sethia, Hyderabad (IN); Abhijit Behera, Hyderabad (IN); Sivashalini S, Chennai (IN); Sandeep Reddy Kothapeta, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/239,291

(22) Filed: Aug. 29, 2023

(51) Int. Cl.
*G07F 19/00* (2006.01)
*G06F 21/86* (2013.01)

(52) U.S. Cl.
CPC ............ *G07F 19/207* (2013.01); *G06F 21/86* (2013.01); *G07F 19/209* (2013.01); *G07F 19/211* (2013.01)

(58) Field of Classification Search
CPC .... G07F 19/207; G07F 19/209; G07F 19/211; G06F 21/86
(Continued)

(56) References Cited

U.S. PATENT DOCUMENTS 7,081,657 B2   7/2006  Faris
8,040,291 B2  10/2011  Yang et al.
(Continued)

FOREIGN PATENT DOCUMENTS

AU   2019451095 A1   1/2022
CN    102237976 A   11/2011
(Continued)

OTHER PUBLICATIONS

Oluwatosin, Salami Ibrahim; Development of MEMS and GSM Based ATM Security System; Global Scientific Journals; Department of Electrical and Electronic Engineering; GSJ: vol. 8, Issue 7, Jul. 2020; www.globalscientificjournal.com.
(Continued)

*Primary Examiner* — Ahshik Kim
(74) *Attorney, Agent, or Firm* — Banner & Witcoff, Ltd.

(57) ABSTRACT

A smart-dust information security and energy optimization process/machine/system is disclosed for use with an ATM. Tiny microelectromechanical systems (MEMS) less than 1 mm in size are deployed and distributed in and around the ATM internal and external components. The MEMS include various sensors to detect component malfunctions and identify security threats (e.g., card skimmers), and also to place the ATM in a reduced energy state whenever possible. MEMS interoperable components and sensors may include, inter alia, batteries, wireless transmitters/receivers, processors, memory, analog-to-digital converters, LIDAR, photo detectors, vibration detectors, motion detectors, wireless signal detectors for detecting Bluetooth or RFID signals, temperature sensors, humidity sensor, a power consumption/induced electromagnetic energy sensors, piezoelectric sensors, sound sensors, etc. The components and sensors are interoperable with one another, and the MEMS are in wireless communication with one another and ultimately with the ATM. Additional features and functionality are disclosed.

19 Claims, 6 Drawing Sheets

(58) Field of Classification Search
USPC .......................................................... 235/379
See application file for complete search history.

(56) References Cited

U.S. PATENT DOCUMENTS

| | | | |
|---|---|---|---|
| 8,783,113 | B2 | 7/2014 | Robert et al. |
| 8,964,298 | B2 | 2/2015 | Haddick et al. |
| 9,179,864 | B2 | 11/2015 | Otto et al. |
| 9,411,955 | B2 | 8/2016 | Jakobsson |
| 9,431,440 | B2 | 8/2016 | Souchkov |
| 9,517,929 | B2 | 12/2016 | Hosseini |
| 9,984,538 | B2 | 5/2018 | Crist et al. |
| 10,034,066 | B2 | 7/2018 | Tran et al. |
| 10,875,034 | B2 | 12/2020 | Krichtafovitch |
| 11,296,052 | B2 | 4/2022 | Meyers et al. |
| 11,657,681 | B1 * | 5/2023 | Rodriguez Bravo ........................ G07F 19/207 235/379 |
| 2008/0079550 | A1 | 4/2008 | Briggs et al. |
| 2008/0296365 | A1 * | 12/2008 | Schliebe ............. G07F 19/2055 235/379 |
| 2017/0309152 | A1 | 10/2017 | Dinkins |
| 2017/0354977 | A1 | 12/2017 | Krichtafovitch |
| 2017/0354981 | A1 | 12/2017 | Krichtafovitch |
| 2020/0008023 | A1 | 1/2020 | Tran et al. |
| 2020/0302810 | A1 | 9/2020 | Lee |
| 2021/0074180 | A1 | 3/2021 | Steketee et al. |
| 2021/0383339 | A1 * | 12/2021 | Ratnakaram ....... G06Q 30/0205 |
| 2022/0028228 | A1 * | 1/2022 | Johnson ................ G06Q 20/204 |
| 2022/0078242 | A1 | 3/2022 | Binder et al. |
| 2022/0108591 | A1 * | 4/2022 | Jayabalan ............. G07F 19/207 |

FOREIGN PATENT DOCUMENTS

| | | |
|---|---|---|
| CN | 102474359 B | 11/2014 |
| CN | 104820220 A | 8/2015 |
| CN | 104159220 B | 6/2018 |
| CN | 211155545 U | 8/2020 |
| IN | 101414407 A | 4/2009 |
| JP | 4750109 B2 | 8/2011 |
| KR | 100668524 B1 | 1/2007 |
| KR | 20070005982 A | 1/2007 |
| KR | 100865606 B1 | 10/2008 |
| KR | 20150070692 A | 6/2015 |
| KR | 101822421 B1 | 1/2018 |
| TW | 200934692 A | 8/2009 |
| WO | 2007096293 A1 | 8/2007 |
| WO | 2007096301 A1 | 8/2007 |

OTHER PUBLICATIONS

Sirisha, et al.; ATM Security Using GSM and MEMS Sensor; International Research Journal of Engineering and Technology; vol. 06; Issue 04; Apr. 2019; www.irjet.net.

* cited by examiner

MICROELECTROMECHANICAL SYSTEM SENSORS FOR ATM INFORMATION SECURITY

TECHNICAL FIELD

The present disclosure relates to information security and, more particularly, to systems, methods, and apparatus for access control to prevent unauthorized access to resources of a system or information system, including the manner of verifying the entity, process, or mechanism requesting access to an automated teller machine (ATM) resource by confirming that sensors in microelectromechanical/nano-electromechanical systems, which are in direct/indirect wireless communication with each other and/or the ATM, have not detected any conditions, internal (or in close proximity) to the machine or any of its components, that may be indicative of a potential security risk or component failure as well as to monitor/control electricity demand to enhance security and optimize energy consumption.

DESCRIPTION OF THE RELATED ART

The use of automated teller machines is linked to a variety of different threat vectors and security risks. ATM skimming is one example of a type of credit card fraud. This type of fraud occurs when criminals attach a device to an ATM that captures cardholder information, such as the card number, expiration date, and personal identification number (PIN). One such device is a card skimmer, which is a device that are placed over the card reader on an ATM. When a card is inserted into the skimmer, the device captures the card number and other data. After obtaining this information, counterfeit cards that are capable of making cash withdrawals from the victim's account are created and used. It may be difficult to detect such devices and perform real-time monitoring of internal ATM components and physical phenomena in close proximity to the machine or its components. Further, there is no guarantee that ATMs can be deactivated in real-time, let alone deactivated remotely, even if problems or potential problems are identified.

Relatedly, real-time "always active" ATMs utilize more power and electricity when they are operated constantly and in active mode. Annual electricity consumption of typical ATMs is around 2.4 MWh. Operating ATMs at full power usage can enable some security features but comes at a substantial financial cost and waste of energy consumption. Further, if skimming or other unlawful devices are connected to the ATM, they may also be drawing electrical power thereby increasing energy consumption.

Also known is "smart dust," which is tiny systems of sensors, robots, or other devices. They are usually operated on a computer network wirelessly and are distributed over some area to perform tasks, usually sensing through radio-frequency identification. It can be used to monitor industrial processes, track the movement of people and goods, or even detect environmental pollutants. It can be used to monitor air quality, water quality, and other environmental factors. It can help to identify and track pollution sources, and to assess the impact of climate change. Smart dust could also be used to monitor industrial processes to prevent accidents and to improve efficiency. It could also be used to track the movement of people and goods in order to help to improve traffic management and to ensure the safety of passengers.

The concept of adapting smart dust or the like in order to provide enhanced internal/external ATM security and also optimize energy consumption is heretofore unknown.

Hence there is a long felt and unsatisfied need to provide improved, real-time, monitoring, control, communications, fraud prevention, and enhanced security for ATMs (including internal/external components thereof) while simultaneously optimizing energy consumption.

SUMMARY OF THE INVENTION

In accordance with one or more arrangements of the non-limiting sample disclosures contained herein, solutions are disclosed to address one or more of the shortcomings in the field of information security in order to provide improved, real-time, monitoring, control, communications, fraud prevention, and enhanced security for ATMs (including internal/external components thereof) while simultaneously optimizing energy consumption by, inter alia, (a) utilizing tiny microelectromechanical/nano-electromechanical systems with sensors (collectively, MEMS or motes) that are distributed in and/or around ATMs, ATM components, ATM external interfaces/readers/openings/wires/circuits, ATM card readers, etc. in order to detect security threats (e.g., credit card skimmers, etc.) provide information, feedback, wireless communication, and wireless relaying of sensed data to the ATM for monitoring and control; (b) using data sensed and transmitted/relayed by MEMS or motes to ATMs to conserve energy at ATMs to hibernate or reduce electrical consumption when not in use or not likely to be in use in the near future, and to transition to active mode based on other sensed inputs; (c) utilizing MEMS or motes to detect suspicious activity inside an ATM and/or in proximity to the ATM and thereby enable automatic shutdown of the ATM, remote notification to appropriate personnel of security risks, and/or enable remote access, monitoring, investigation, and/or control of the ATM; and (d) utilizing MEMS or motes to monitor ATM components, etc. to detect malfunctions, outages, or other problems and enable immediate reporting of the same.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, electricity usage of ATM can be reduced when the ATM is not used for extended time intervals (e.g., a couple of hours) and during non-peak periods (e.g., 11 pm to 6 am timeframe when the ATM is unused for approximately 99% of the time). This can be achieved with the help of MEMS sensors present in smart dust. When there is no usage detected at ATM, the tiny motes-microelectromechanical sensors can detect inactivity and make the ATM to go for hibernate mode resulting in a savings of electrical power consumption. Whenever there is a human activity detected (e.g., by motion detectors, temperature sensors, photodetectors, sound sensors, laser diodes, etc.), the MEMS can signal the ATM to wake up or activate in order to quickly return to a normal mode with all existing functionalities.

In some arrangements, if there is some suspicious ATM activity detected (e.g., any unusual movements or sounds), sensors can wirelessly communicate and alert relevant authorities. This will minimize fraud attacks and increase ATM security.

In some arrangements, there are various components present in ATM to make it fully function. These components can be monitored with the help of various sensors present in the MEMS and if any components are malfunctioning, information security servers or the like can be immediately notified to help check on the issue without delay, alert the bank server immediately, and help to check on the issue promptly.

In some arrangements, MEMS or motes may contain various power, communication, memory, computing, processing, and sensor components. These may include (as referenced in FIG. 3 as examples), inter alia, one or more of various Passive Transmitter—302, Active Transmitter—304, Antenna—306, Relay/Repeater Node—308, Wireless Radio—310, Solar Cell—312, Battery/Energy Storage—314, Power Capacitor—316, Digital Signal Processor—318, Receiver—320, Microcontroller—322, Memory—324, Address/Addressability Component—326, I/O Module—328, Analog to Digital Converter—330, Bus—332, Voltage Divider—334, Laser Diode—336, Temperature Sensor—338, Motion Detector—340, Piezo/Pressure Sensor—342, Humidity Sensor—344, Photodetector/Light Sensor—346, Electrical Current/Electromagnetic Sensor—348, Voltage Detector—350, Vibration Sensor—352, Chemical Sensor—354, Water/Moisture Sensor—356, Sound Sensor—358, and/or Other Sensors—360, etc. These components and other sensors may be used to collect, process, store, transmit, relay, receive, and otherwise handle sensed data and/or make decisions.

In some arrangements, a smart-dust information security and energy optimization process or machine for an automated teller machine (ATM) capable of being used by a human can be utilized. Steps or components can include: providing an ATM, said ATM having a card reader, an internal antenna, a communication interface, an external housing, internal components, and internal wiring/circuitry; distributing, on the card reader, the external housing, the internal components, and the internal wiring, a plurality of microelectromechanical systems (MEMS), said plurality of MEMS capable of wirelessly communicating with one another and with the antenna, each of said plurality of MEMS having an energy storage device, wireless transmitter, wireless receiver, processor, memory, and sensors interoperable together; storing, in the energy storage device in each of the plurality of MEMS, received electrical energy; powering, by the energy storage device, the wireless transmitter, the wireless receiver, the processor, the memory, and the sensors; detecting, by the sensors, sensed data including a human proximity for the human, malfunction indicia for any of said internal components or any of said internal wiring/circuitry, and tamper indicia; transmitting, by a first transmitter in a first of said plurality of MEMS to both a second receiver in a second of said plurality of MEMS and to the antenna, the sensed data; relaying, by a second transmitter in the second of said plurality of MEMS to the antenna, the sensed data; receiving, by the antenna from the first transmitter or the second transmitter, the sensed data; and determining, by the ATM based on the sensed data, whether: to activate or hibernate the ATM based on the human proximity or a time of day, to generate, by the communication interface, a threat notification based on the tamper indicia, to generate, by the communication interface, a component malfunction notification based on the malfunction indicia, to automatically shut down the ATM based on the threat indicia or the malfunction indicia, and to remotely shut down the ATM based on a remote response received from a remote server regarding the threat notification or the component malfunction notification.

In some arrangements, a smart-dust information security and energy optimization process or machine for an automated teller machine (ATM) capable of being used by a human can be utilized. Steps or components can include: providing an ATM, said ATM having a card reader, an internal antenna, a communication interface, an external housing, internal components, and internal wiring/circuitry; distributing, on the card reader, the external housing, the internal components, and the internal wiring, a plurality of microelectromechanical systems (MEMS), said plurality of MEMS capable of wirelessly communicating with one another and with the antenna, each of said plurality of MEMS having a battery, wireless transmitter, wireless receiver, processor, memory, and sensors interoperable together; storing, in the battery in each of the plurality of MEMS, electrical energy received from a solar cell in each of the plurality of MEMS or received by electromagnetic induction from the internal wiring/circuitry; powering, by the battery, the wireless transmitter, the wireless receiver, the processor, the memory, and the sensors; detecting, by the sensors, sensed data including LIDAR, vibration, motion detection, temperature, humidity, power draw, or a wireless signal; transmitting, by a first transmitter in a first of said plurality of MEMS to both a second receiver in a second of said plurality of MEMS and to the antenna, the sensed data; relaying, by a second transmitter in the second of said plurality of MEMS to the antenna, the sensed data; receiving, by the antenna from the first transmitter or the second transmitter, the sensed data; generating, by the ATM, a consensus of the sensed data received from the plurality of MEMS in order to prevent erroneous interpretations if the sensed data is conflicting; determining, by the ATM based on the consensus, a human proximity for the human, malfunction indicia for any of said internal components or any of said internal wiring/circuitry, and tamper indicia; activating, based on the consensus, the ATM if the human proximity indicates human presence; hibernating, based on the consensus, the ATN if the human proximity indicates human absence; transmitting, by the communication interface based on the consensus, a component malfunction notification based on the malfunction indicia; and transmitting, by the communication interface based on the consensus, a threat notification based on the tamper indicia.

In some arrangements, electrical energy can be received from a solar cell and/or electrical energy can be received by electromagnetic induction from the internal wiring/circuitry.

In some arrangements, the sensors can detect a card skimmer coupled to the card reader such as, by way of non-limiting example, by detected by the plurality of MEMS based on increased electrical power draw.

In some arrangements, each of the MEMS may be less than about 1 millimeter in size. Nano devices may be used in addition to and/or in lieu of MEMS.

In some arrangements, decisions made by the ATM are based on a consensus of the sensed data received from the plurality of MEMS in order to prevent erroneous interpretations if the sensed data is conflicting.

In some arrangements, a smart-dust information security and energy optimization process or machine for an automated teller machine (ATM) capable of being used by a human can be utilized. Steps or components can include: providing an ATM, said ATM having a card reader, an internal antenna, a communication interface, an external housing, internal components, internal wiring/circuitry, and an external camera; distributing, on the card reader, the external housing, the internal components, and the internal wiring, a plurality of microelectromechanical systems (MEMS) each of which is less than 1 millimeter in size, said plurality of MEMS capable of wirelessly communicating with one another and one-way wireless communication to the antenna, each of said plurality of MEMS having a battery, wireless transmitter, wireless receiver, processor, memory, an analog-to-digital converter, and sensors interoperable together, said plurality of sensors including: LIDAR, photo detector, vibration detector, motion detector, a wireless signal detector for detecting Bluetooth or RFID signals, a temperature sensor, a humidity sensor, a power consumption sensor, a piezoelectric sensor, and a sound sensor; storing, in the battery in each of the plurality of MEMS, electrical energy received from a solar cell in each of the plurality of MEMS or received by electromagnetic induction from the internal wiring/circuitry; powering, by the battery, wireless transmitter, wireless receiver, processor, memory, an analog-to-digital converter, and the sensors; detecting, by the LIDAR, the photo detector, the vibration detector, the motion detector, the wireless signal detector, the temperature sensor, the humidity sensor, power consumption sensor, the piezoelectric sensor, and the sound sensor, sensed data; storing, in memory in the plurality of MEMS, the sensed data; transmitting, by a first transmitter in a first of said plurality of MEMS to both a second receiver in a second of said plurality of MEMS and to the antenna, the sensed data; relaying, by a second transmitter in the second of said plurality of MEMS to the antenna, the sensed data; receiving, by the antenna from the first transmitter or the second transmitter, the sensed data; generating, by the ATM, a consensus of the sensed data received from the plurality of MEMS in order to prevent erroneous interpretations if the sensed data is conflicting; determining, by the ATM based on the consensus, a human proximity for the human based on the LIDAR, the motion detector, the wireless signal detector, or the sound sensor; determining, by the ATM based on the consensus, malfunction indicia for any of said internal components or any of said internal wiring/circuitry based on the temperature sensor, the humidity sensor, the power consumption sensor, or the vibration sensor; determining, by the ATM based on the consensus, tamper indicia based on the power consumption sensor or the piezoelectric sensor; activating, based on the consensus, the ATM if the human proximity indicates human presence; hibernating, based on the consensus, the ATN if the human proximity indicates human absence; transmitting, by the communication interface based on the consensus, a component malfunction notification based on the malfunction indicia; transmitting, by the communication interface based on the consensus, a threat notification based on the tamper indicia; determining, by the ATM based on the consensus or a remote response to the component malfunction notification or the threat notification, whether to shut down the ATM; and capturing, by the camera in the ATM, a video image of the human in response to the threat indicia.

In some arrangements, communication between the MEMS may be one-way and any information received is simply relayed, repeatedly if necessary, on to other MEMS until the sensed data eventually is received by the ATM.

In some arrangements, communication between the MEMS themselves may be two-way.

In some arrangements, communication between the MEMS and the ATM nay be two-way. In such cases, the ATM will include both an antenna/receiver and a local transmitter/broadcaster.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1A:
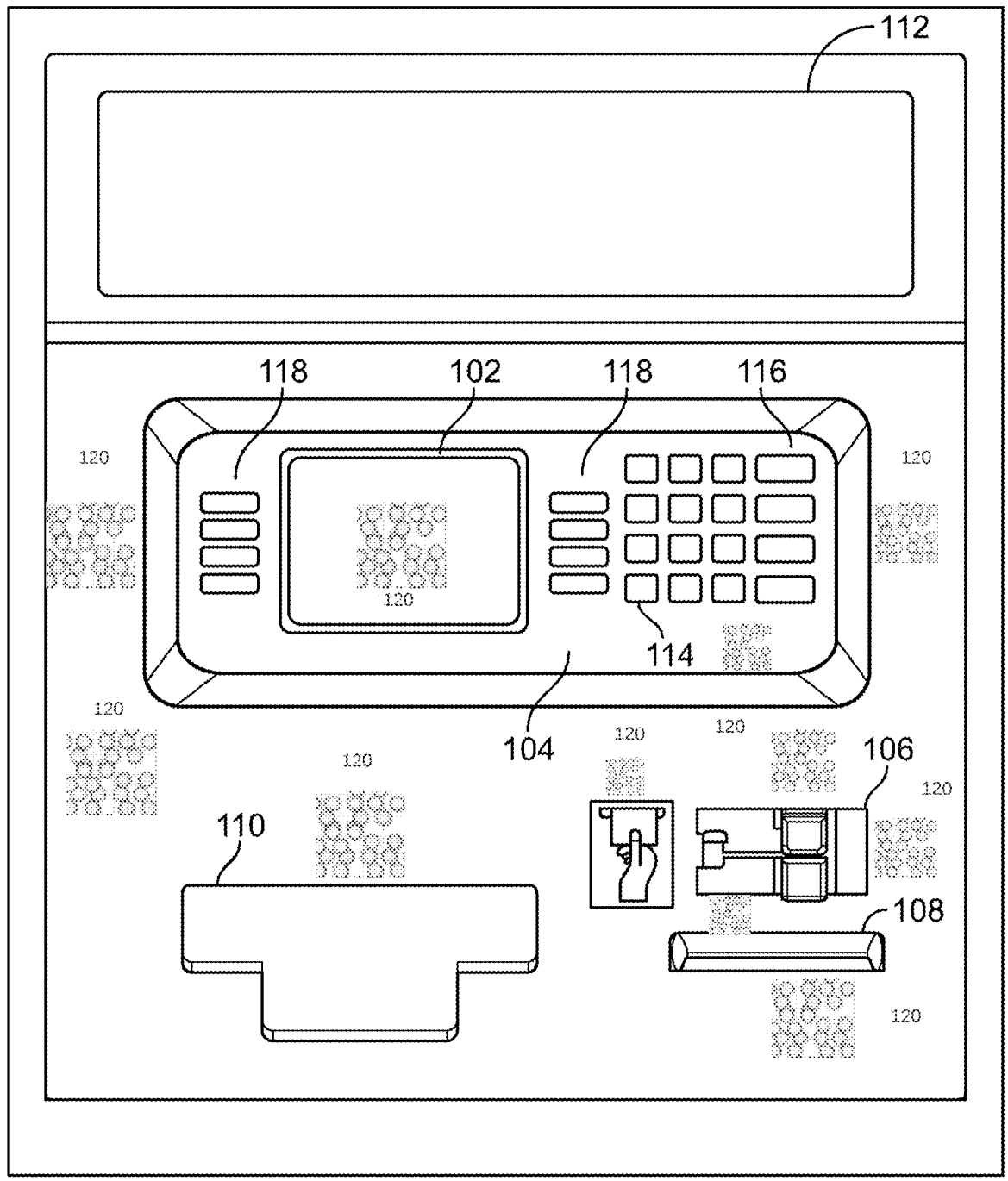
FIG. 1A depicts an external view and external components of an exemplary ATM system utilizing MEMS or motes in accordance with one or more information-security aspects of this disclosure as they relate to providing improved, real-time, monitoring, control, communications, fraud prevention, and enhanced security for ATMs (including internal/external components thereof) while simultaneously optimizing energy consumption.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

By way of non-limiting example, FIG. 1A depicts an external view and external components of an exemplary ATM system utilizing MEMS or motes in accordance with one or more information-security aspects of this disclosure as they relate to providing improved, real-time, monitoring, control, communications, fraud prevention, and enhanced security for ATMs (including internal/external components thereof) while simultaneously optimizing energy consumption.

FIG. 1A shows examples of components taken from a conventional ATM 100A. One such illustration can be found in U.S. Pat. No. 9,984,538. Monitor 102, keypad 104, card reader port 106, acceptor 108, item dispenser 110, and security screen 112 are all possible components of an automated teller machine. It is possible for Monitor 102 to communicate with a customer using either visual or audio information. The customer may be able to enter numerical and textual information using the keypad 104, which may include alphanumeric keys 114. Control keys 116 could be included on the keypad 104. The control information, such as instructions, that you need to communicate to the self-service device 100 can be sent via the control keys 116. It's possible that the keypad 104 has some soft keys 118. The customer is informed of the functions that soft keys 118 may have by using information that may be displayed on monitor 102. These functions may be predetermined by the programming of the system.

The front end of any card reader that is suitable can be plugged into card reader port 106. The card reader has the capability of reading information that is magnetically encoded on transaction instruments such as bank cards. A contactless chip reader, a wireless transceiver, or any other interface that is deemed suitable for exchanging transaction information with a transaction instrument may be included in the automated teller machine. A chip, an RFID tag, a smart card, a tablet, a smartphone, or any other device that is suitable may serve as the transaction instrument.

The automated teller machine might have a biometric sensor (not shown). A customer could be recognized by the biometric sensor based on a distinguishing trait, such as an anatomical feature, that is unique to that customer. For instance, the biometric sensor may be programmed to identify the customer based on all or part of a face, a fingerprint, an iris, a retina, a hand, or any other suitable anatomical feature. Similarly, the sensor may be programmed to identify the customer based on any other suitable anatomical feature. A behavioral feature, such as a signature, a voice, a gait, or any other suitable behavioral characteristic, may be used by the biometric sensor to identify the customer. Other behavioral characteristics may also be used.

Acceptor 108 is able to take almost any suitable physical object. For instance, acceptor 108 is able to take in envelops, deposit slips, bills, and checks, in addition to any other appropriate documents. It's possible that Acceptor 108 feeds documents into a scanner, which then digitizes them for image-based transaction processing. Item dispenser 110 may dispense items. For instance, item dispenser 110 may dispense various forms of currency. Bills that have not been collected by a user of device 100 can be retracted by item dispenser 110. The visual input from a surveillance device may be screened by security screen 112. (not shown). It is possible for the surveillance device to provide video information about people who are present close to the self-service device as well as the conditions that are present there. It is possible for the surveillance device to pick up on the fact that there is motion in the area around device 100.

Smart dust/MEMS/motes 120 may be deployed and/or distributed around, on, or in various aspects of the ATM 100A as depicted in accordance with various aspects of this invention.

Figure 1B:
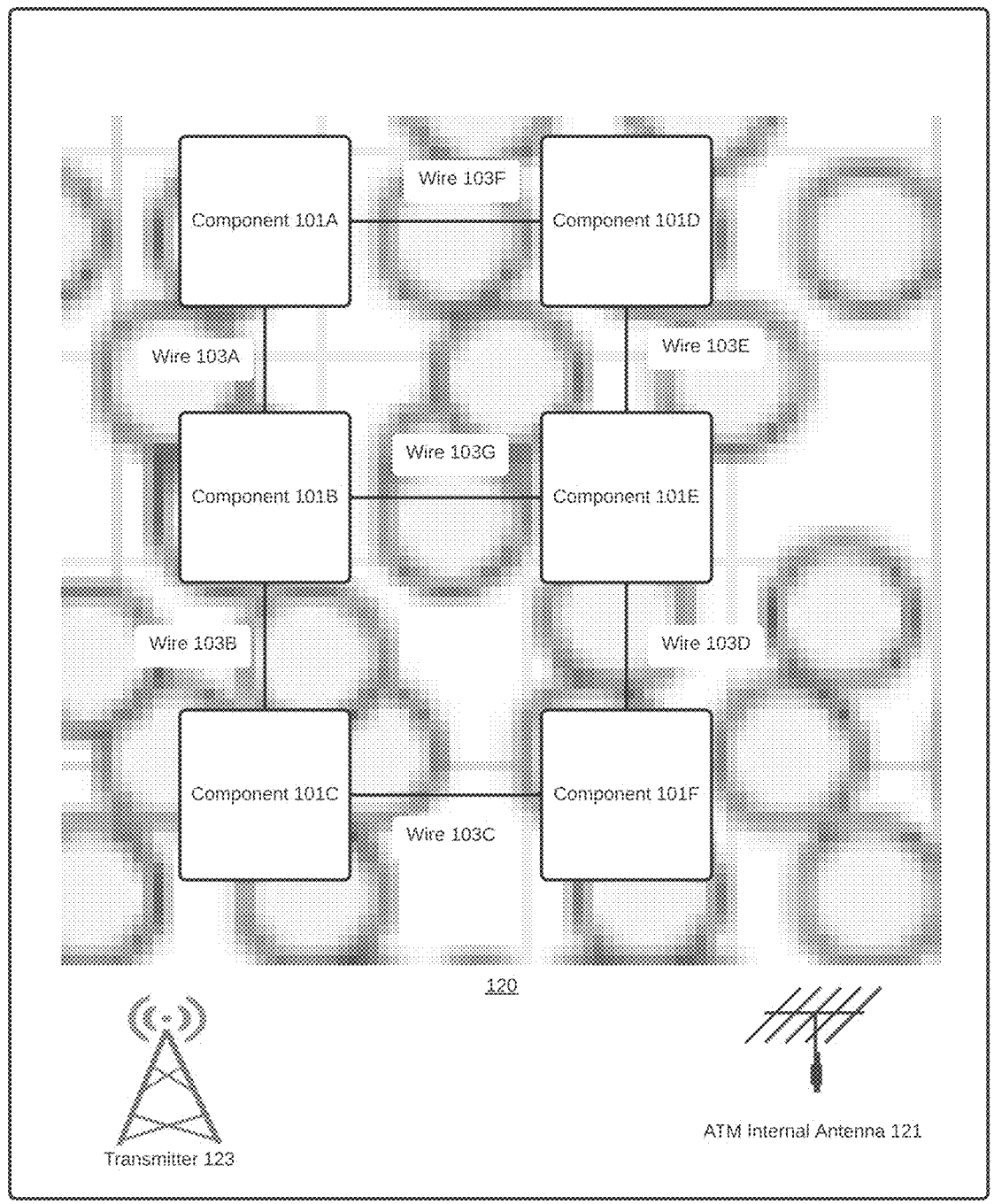
FIG. 1B depicts an internal generalized view with sample generic internal components and internal wiring of an exemplary ATM system utilizing MEMS or motes in accordance with one or more information-security aspects of this disclosure as they relate to providing improved, real-time, monitoring, control, communications, fraud prevention, and enhanced security for ATMs (including internal/external components thereof) while simultaneously optimizing energy consumption.

By way of non-limiting example, FIG. 1B depicts an internal generalized view with sample generic internal components and internal wiring of an exemplary ATM system utilizing MEMS or motes in accordance with one or more information-security aspects of this disclosure as they relate to providing improved, real-time, monitoring, control, communications, fraud prevention, and enhanced security for ATMs (including internal/external components thereof) while simultaneously optimizing energy consumption.

As shown, smart dust/MEMS/motes 120 may be deployed and/or distributed around, on, or in various aspects of the ATM internal components 100B as depicted in accordance with various aspects of this invention. In particular, they may be deployed on or around various components, which are generically represented as internal components 101A-F and internal wiring/circuitry 103A-G. The internal components 101 and 103 are standard components and wiring utilized in commercially available ATMs. The ATM may also include internal/external transmitter(s) 123 and antenna 121 as appropriate to communicate with remote servers/control/monitoring facilities as well as locally with the smart dust/MEMS.

Figure 1C:
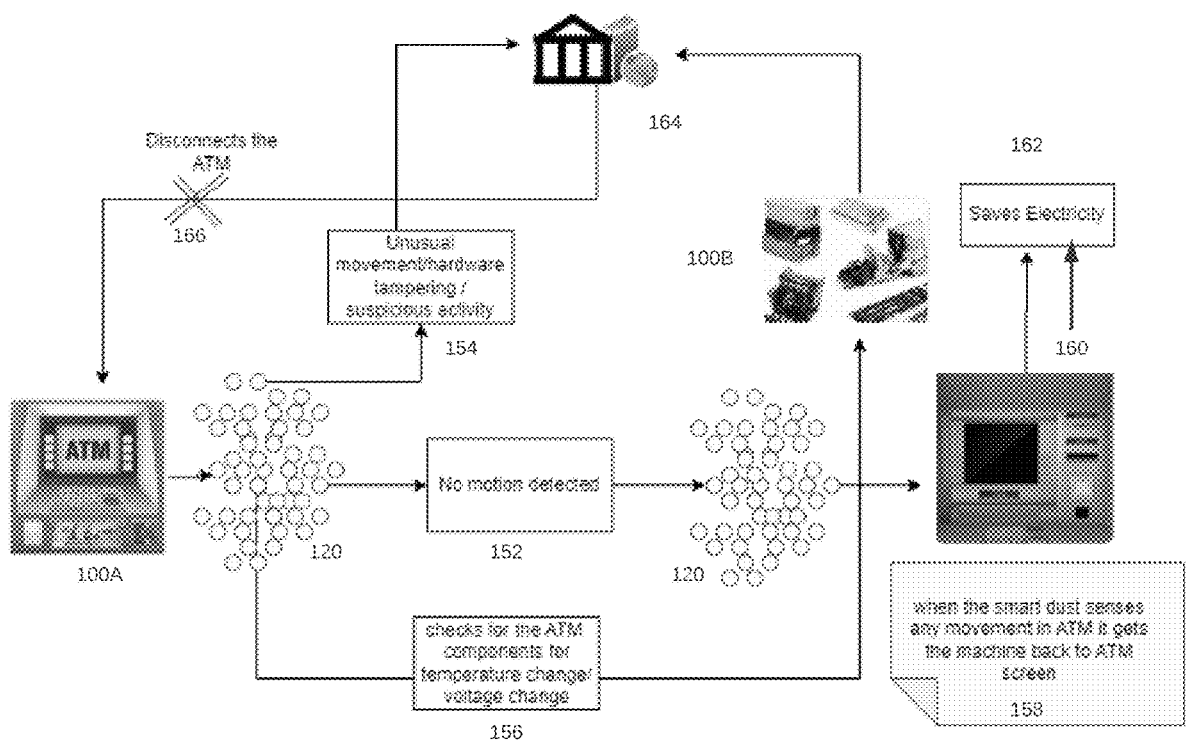
FIG. 1C depicts an exemplary functional, flow diagram showing sample interactions, interfaces, steps, functions, and components for an ATM system utilizing MEMS or motes in accordance with one or more information-security aspects of this disclosure as they relate to providing improved, real-time, monitoring, control, communications, fraud prevention, and enhanced security for ATMs (including internal/external components thereof) while simultaneously optimizing energy consumption.

By way of non-limiting disclosure, FIG. 1C depicts an exemplary functional, flow diagram showing sample interactions, interfaces, steps, functions, and components for an ATM system utilizing MEMS or motes in accordance with one or more information-security aspects of this disclosure as they relate to providing improved, real-time, monitoring, control, communications, fraud prevention, and enhanced security for ATMs (including internal/external components thereof) while simultaneously optimizing energy consumption.

Figure 3:
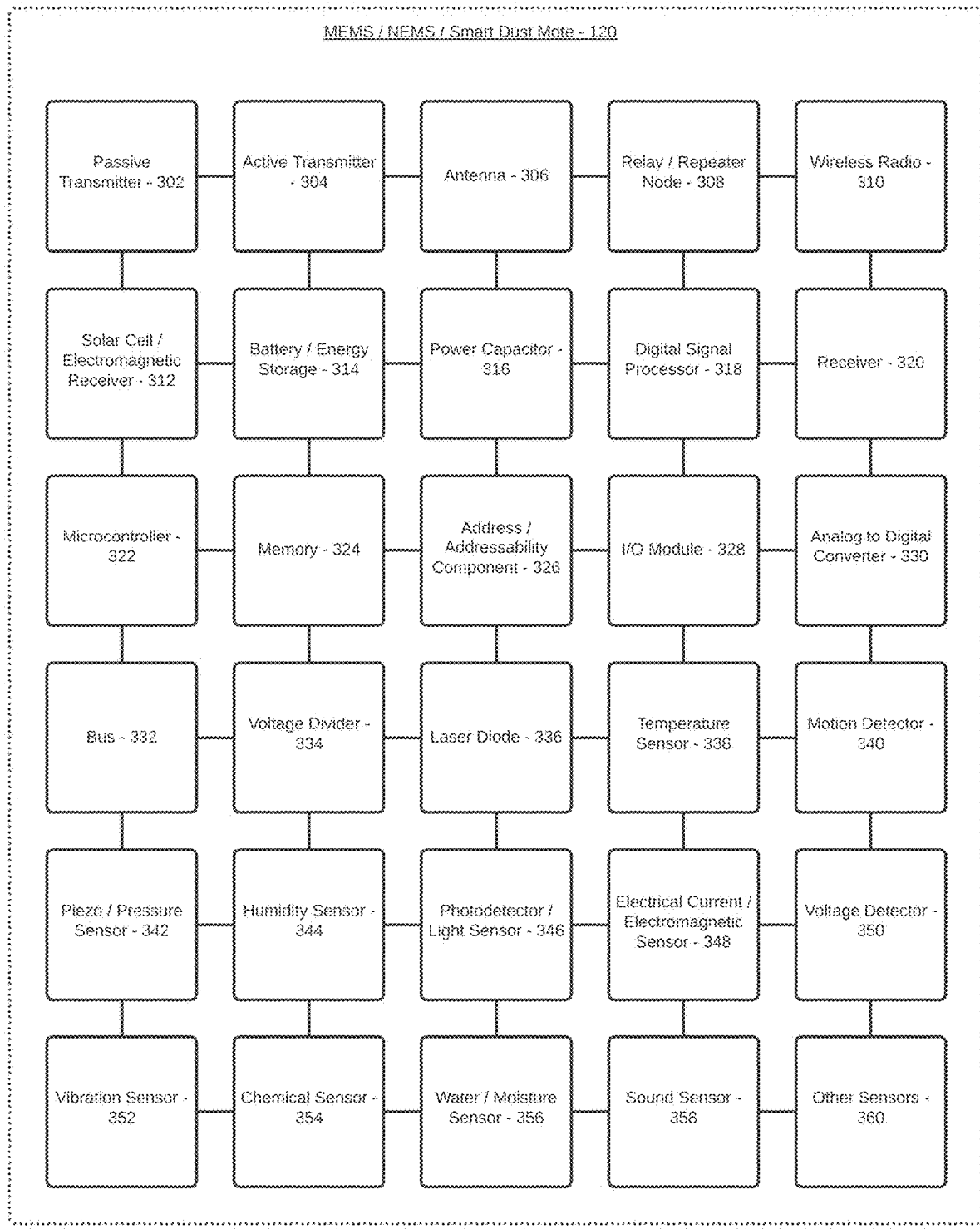
FIG. 3 illustrates various sample components and functionality for MEMS or motes that can be used in, around, and in conjunction with ATMs in accordance with one or more information-security aspects of this disclosure as they relate to providing improved, real-time, monitoring, control, communications, fraud prevention, and enhanced security for ATMs (including internal/external components thereof) while simultaneously optimizing energy consumption.

ATM 100A/ATM internal components 100B have MEMS 120 deployed thereon and distributed therein, which utilize various sensors such as shown in FIG. 3 to acquire sensed data. Information security actions and energy optimization activities may be taken by the ATM based on the sensed data. A few non-exhaustive examples are provided in FIG. 1C to demonstrate this.

The sensors in the MEMS may determine that no motion is detected 152 or that there is no human in proximity to the ATM based on motion detectors, LIDAR, wireless signal detection, etc. The MEMS may then communicate that directly to an antenna in the ATM and/or relay that information to other MEMS until the signal eventually reaches the ATM. If no human is in proximity, the ATM may go into hibernation or other energy conservation mode 160 in order to reduce electricity. When the smart dust or the like senses any movement or other indicia indicating the presence of a human, the machine can activate can display the normal ATM screen and resume normal functionality as in 158.

The sensors in the MEMS may detect any unusual movement, hardware tampering, or other suspicious activity 154. Similarly, checks can be made for internal ATM components for temperature, humidity, voltage, current, or physical phenomena changes 156. These can be transmitted/related to the ATM from the MEMS and then appropriate threat, malfunction, etc. notifications can be made to a remote information security server or the like 164. Decisions may be made to then remotely disconnect or shut down the ATM as in 166.

By way of non-limiting disclosure, FIG. 1B depicts an exemplary functional, flow diagram showing sample interactions, interfaces, steps, functions, and components for an ATM system utilizing MEMS or motes in accordance with one or more information-security aspects of this disclosure as they relate to providing improved, real-time, monitoring, control, communications, fraud prevention, and enhanced security for ATMs (including internal/external components thereof) while simultaneously optimizing energy consumption.

Figure 2:
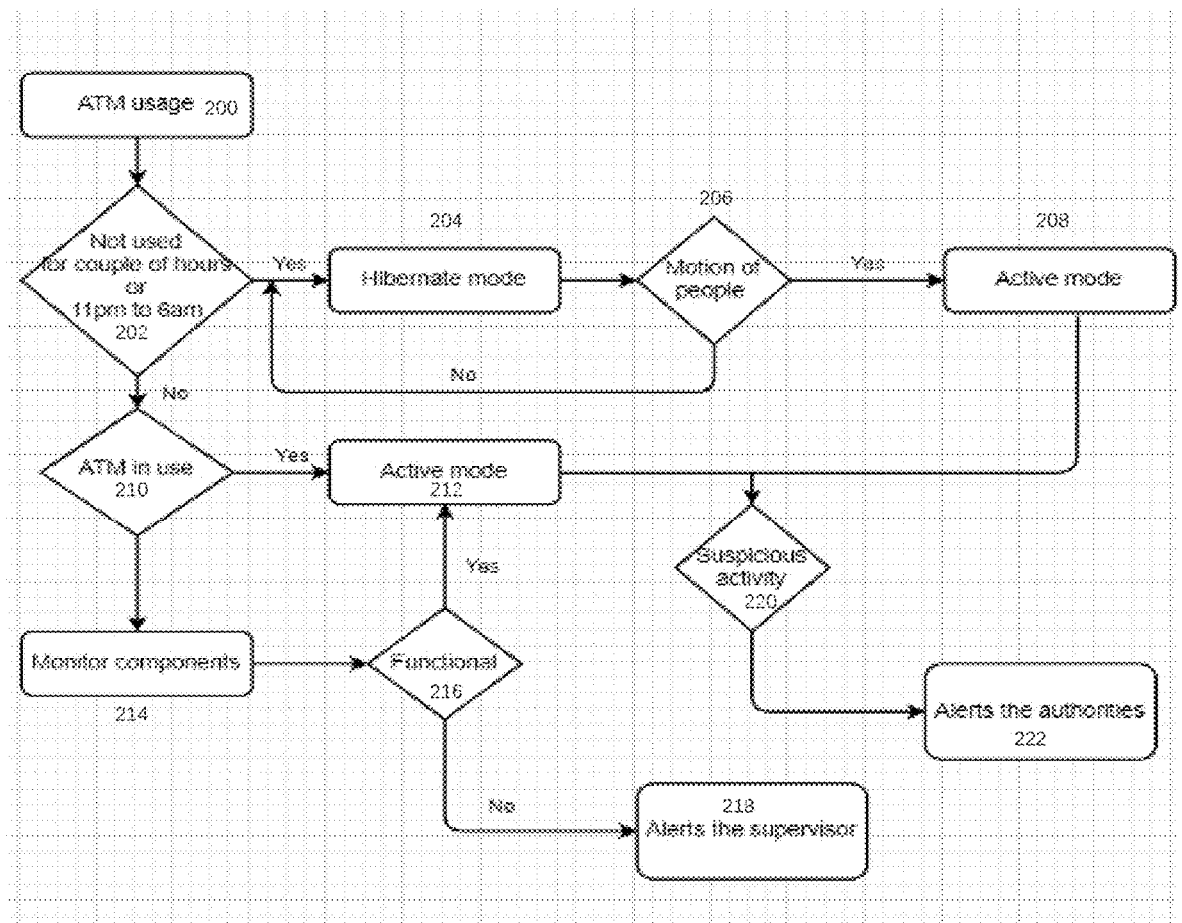
FIG. 2 depicts an exemplary functional, flow diagram showing sample interactions, interfaces, steps, and functions for an ATM system utilizing MEMS or motes in accordance with one or more information-security aspects of this disclosure as they relate to providing improved, real-time, monitoring, control, communications, fraud prevention, and enhanced security for ATMs (including internal/external components thereof) while simultaneously optimizing energy consumption.

By way of non-limiting disclosure, FIG. 2 depicts an exemplary functional, flow diagram showing sample interactions, interfaces, steps, and functions for an ATM system utilizing MEMS or motes in accordance with one or more information-security aspects of this disclosure as they relate to providing improved, real-time, monitoring, control, communications, fraud prevention, and enhanced security for ATMs (including internal/external components thereof) while simultaneously optimizing energy consumption.

ATM usage may be commenced in 200. If the ATM has not been used for a period of time such as, for example, for a couple of hours, or if the time of day is an off-peak period 202, the ATM may go into a hibernate mode to conserve energy 204. If a human presence is detected by motion (or otherwise as described elsewhere herein) 206, the ATM may be reactivated in 208. Otherwise, the ATM may continue in conservation mode.

If the ATM has been used recently or if the time of day is during a commonly used period 210, the ATM may be placed or remain in active mode 212. Internal and external components may be monitored by the MEMs 214. If functional 216 and no malfunctions or threats are detected, the ATM may continue in active mode 212. If a malfunction is detected, appropriate malfunction notifications may be transmitted to supervisors, information security servers, or the like. If suspicious activity or threats are detected in 220, again, alerts to the appropriate authorities may be generated and transmitted. Remote monitoring and control may be performed by remote information security servers. Automatic or remote shutdown or suspension of activities may be performed depending on the particular potential component malfunction or tampering/security threat, such as installation of a credit/debit card skimmer.

By way of non-limiting disclosure, FIG. 3 illustrates various sample components and functionality for MEMS or motes that can be used in, around, and in conjunction with ATMs in accordance with one or more information-security aspects of this disclosure as they relate to providing improved, real-time, monitoring, control, communications, fraud prevention, and enhanced security for ATMs (including internal/external components thereof) while simultaneously optimizing energy consumption.

As depicted in FIG. 3, MEMS or motes may contain various power, communication, memory, computing, processing, and sensor components. For example, these may include, inter alia, one or more of various Passive Transmitter—302, Active Transmitter—304, Antenna—306, Relay/Repeater Node—308, Wireless Radio—310, Solar Cell—312, Battery/Energy Storage—314, Power Capacitor—316, Digital Signal Processor—318, Receiver—320, Microcontroller—322, Memory—324, Address/Addressability Component—326, I/O Module—328, Analog to Digital Converter—330, Bus—332, Voltage Divider—334, Laser Diode—336, Temperature Sensor—338, Motion Detector—340, Piezo/Pressure Sensor—342, Humidity Sensor—344, Photodetector/Light Sensor—346, Electrical Current/Electromagnetic Sensor—348, Voltage Detector—350, Vibration Sensor—352, Chemical Sensor—354, Water/Moisture Sensor—356, Sound Sensor—358, and/or Other Sensors—360, etc. Additional components, sensors, and functionality may also be included as otherwise referenced herein. This diagram is only intended to provide a sampling of potential components and functionalities and is in no way to be considered limiting.

Figure 4:
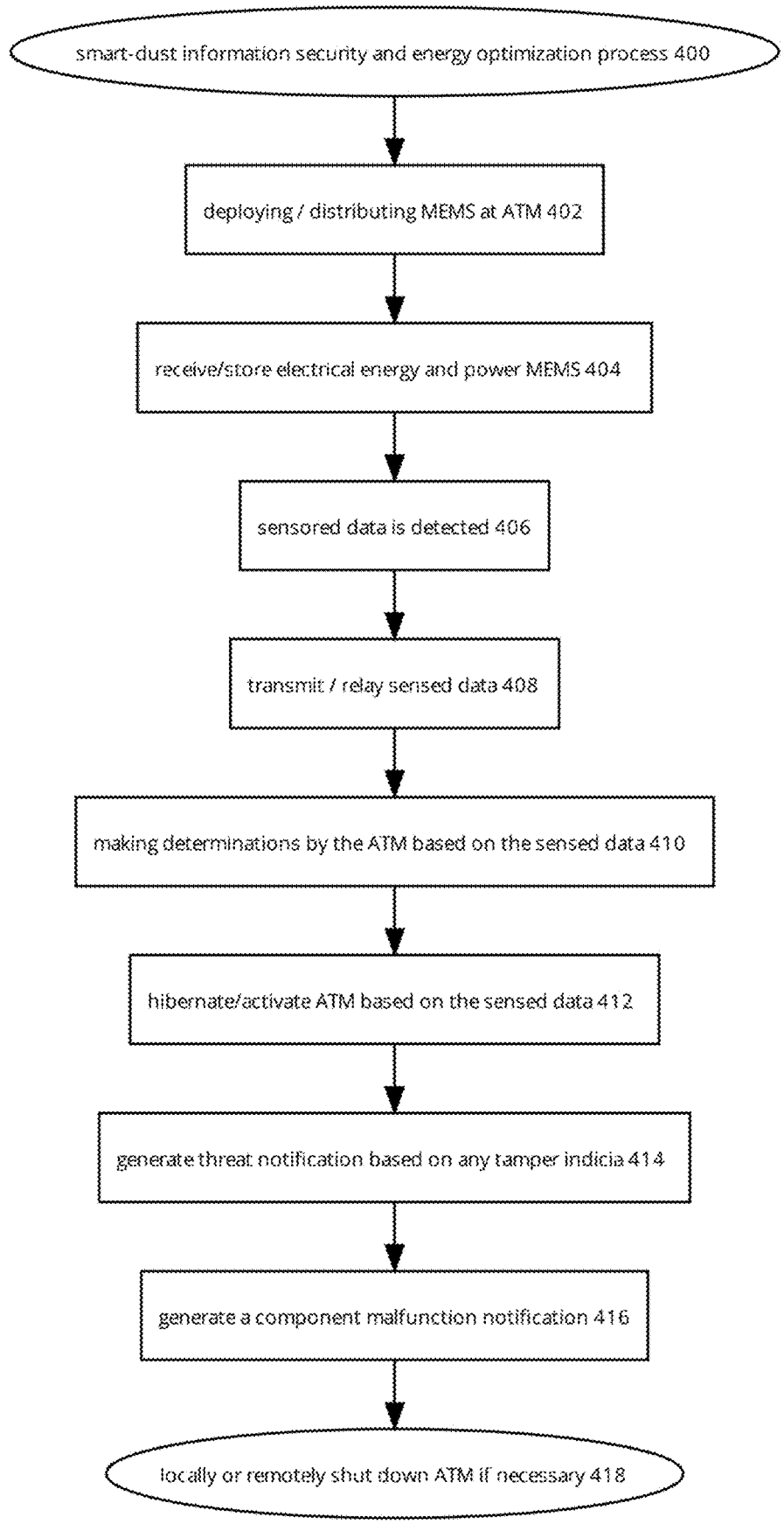
FIG. 4 illustrates various sample flows and functionality for MEMS or motes that can be used in, around, and in conjunction with ATMs in accordance with one or more information-security aspects of this disclosure as they relate to providing improved, real-time, monitoring, control, communications, fraud prevention, and enhanced security for ATMs (including internal/external components thereof) while simultaneously optimizing energy consumption.

FIG. 4 illustrates various sample "high level" flows and functionality for MEMS or motes that can be used in, around, and in conjunction with ATMs in accordance with one or more information-security aspects of this disclosure as they relate to providing improved, real-time, monitoring, control, communications, fraud prevention, and enhanced security for ATMs (including internal/external components thereof) while simultaneously optimizing energy consumption.

As one high level graphical illustration, FIG. 4 shows a smart-dust information security and energy optimization process initiated in 400. MEMS are deployed/distributed on, in, or about ATM in 402. Electrical energy and power is received and stored in MEMS at 404. Sensed data is detected and stored in 406. The sensed data is transmitted/relayed in 408 to the ATM, which makes determinations based on the sensed data in 410. Hibernation/activation of the ATM is performed based on the sensed data 412. Threat notification based on any tamper indicia may be generated in 414. Component malfunction notifications, if malfunctions are detected, may be generated in 416. ATMs may be shut down automatically or remotely based on instructions from monitoring/control servers to save energy or, if necessary, for security threats or malfunctions in 418.

Skilled artisans will recognize that any number of additional process flows may be implemented consistent with the various arrangements described throughout this application. Hence further flow diagrams would be superfluous to the written descriptions and explanations already provided.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A smart-dust information security and energy optimization process for an automated teller machine (ATM) capable of being used by a human comprising the steps of:
   providing an ATM, said ATM having a card reader, an internal antenna, a communication interface, an external housing, internal components, and internal wiring/circuitry;
   distributing, on the card reader, the external housing, the internal components, and the internal wiring, a plurality of microelectromechanical systems (MEMS), said plurality of MEMS capable of wirelessly communicating with one another and with the antenna, each of said plurality of MEMS having an energy storage device, wireless transmitter, wireless receiver, processor, memory, and sensors interoperable together;
   storing, in the energy storage device in each of the plurality of MEMS, received electrical energy;
   powering, by the energy storage device, the wireless transmitter, the wireless receiver, the processor, the memory, and the sensors;
   detecting, by the sensors, sensed data including a human proximity for the human, malfunction indicia for any of said internal components or any of said internal wiring/circuitry, and tamper indicia;

transmitting, by a first transmitter in a first of said plurality of MEMS to both a second receiver in a second of said plurality of MEMS and to the antenna, the sensed data;
relaying, by a second transmitter in the second of said plurality of MEMS to the antenna, the sensed data;
receiving, by the antenna from the first transmitter or the second transmitter, the sensed data; and
determining, by the ATM based on the sensed data, whether:
  to activate or hibernate the ATM based on the human proximity or a time of day,
  to generate, by the communication interface, a threat notification based on the tamper indicia,
  to generate, by the communication interface, a component malfunction notification based on the malfunction indicia,
  to automatically shut down the ATM based on the threat indicia or the malfunction indicia, and
  to remotely shut down the ATM based on a remote response received from a remote server regarding the threat notification or the component malfunction notification.

2. The smart-dust information security and energy optimization process of claim 1 wherein the electrical energy is received from a solar cell.

3. The smart-dust information security and energy optimization process of claim 1 wherein the electrical energy is received by electromagnetic induction from the internal wiring/circuitry.

4. The smart-dust information security and energy optimization process of claim 2 wherein at least one of the sensors can detect a card skimmer coupled to the card reader.

5. The smart-dust information security and energy optimization process of claim 4 wherein the card skimmer is detected by the plurality of MEMS based on increased electrical power draw.

6. The smart-dust information security and energy optimization process of claim 4 wherein the sensed data includes light detection, vibration, motion detection, temperature, or humidity detected by the plurality of MEMS.

7. The smart-dust information security and energy optimization process of claim 6 wherein the human proximity is detected by the plurality of MEMS based on the motion detection.

8. The smart-dust information security and energy optimization process of claim 6 wherein the sensed data includes detection of a wireless signal and the human proximity is determined based on detection of the wireless signal.

9. The smart-dust information security and energy optimization process of claim 8 wherein the wireless signal is received from Bluetooth device or an RFID device.

10. The smart-dust information security and energy optimization process of claim 9 wherein each of the plurality of MEMS is less than 1 millimeter in size in any dimension.

11. The smart-dust information security and energy optimization process of claim 10 wherein decisions made by the ATM are based on a consensus of the sensed data received from the plurality of MEMS in order to prevent erroneous interpretations if the sensed data is conflicting.

12. A smart-dust information security and energy optimization process for an automated teller machine (ATM) capable of being used by a human comprising the steps of:
providing an ATM, said ATM having a card reader, an internal antenna, a communication interface, an external housing, internal components, and internal wiring/circuitry;
distributing, on the card reader, the external housing, the internal components, and the internal wiring, a plurality of microelectromechanical systems (MEMS), said plurality of MEMS capable of wirelessly communicating with one another and with the antenna, each of said plurality of MEMS having a battery, wireless transmitter, wireless receiver, processor, memory, and sensors interoperable together;
storing, in the battery in each of the plurality of MEMS, electrical energy received from a solar cell in each of the plurality of MEMS or received by electromagnetic induction from the internal wiring/circuitry;
powering, by the battery, the wireless transmitter, the wireless receiver, the processor, the memory, and the sensors;
detecting, by the sensors, sensed data including LIDAR, vibration, motion detection, temperature, humidity, power draw, or a wireless signal;
transmitting, by a first transmitter in a first of said plurality of MEMS to both a second receiver in a second of said plurality of MEMS and to the antenna, the sensed data;
relaying, by a second transmitter in the second of said plurality of MEMS to the antenna, the sensed data;
receiving, by the antenna from the first transmitter or the second transmitter, the sensed data;
generating, by the ATM, a consensus of the sensed data received from the plurality of MEMS in order to prevent erroneous interpretations if the sensed data is conflicting;
determining, by the ATM based on the consensus, a human proximity for the human, malfunction indicia for any of said internal components or any of said internal wiring/circuitry, and tamper indicia;
activating, based on the consensus, the ATM if the human proximity indicates human presence;
hibernating, based on the consensus, the ATN if the human proximity indicates human absence;
transmitting, by the communication interface based on the consensus, a component malfunction notification based on the malfunction indicia; and
transmitting, by the communication interface based on the consensus, a threat notification based on the tamper indicia.

13. The smart-dust information security and energy optimization process of claim 12 further comprising the step of automatically shutting down the ATM based on the threat indicia or the malfunction indicia.

14. The smart-dust information security and energy optimization process of claim 12 further comprising the step of remotely shutting down the ATM based on a remote response received from a remote server regarding the threat notification or the component malfunction notification.

15. The smart-dust information security and energy optimization process of claim 12 wherein at least one of the sensors can detect a card skimmer coupled to the card reader and the card skimmer is detected by the plurality of MEMS based on increased electrical power draw.

16. The smart-dust information security and energy optimization process of claim 12 wherein the human proximity is detected based on the LIDAR, the motion detection, or the wireless signal which can be either from a Bluetooth device or an RFID device.

17. The smart-dust information security and energy optimization process of claim 16 wherein each of the plurality of MEMS is less than 1 millimeter in size in any dimension.

18. The smart-dust information security and energy optimization process of claim 17 wherein the ATM is in one-way communication with one or more of the plurality of MEMS and the antenna in the ATM only receives the sensed data directly or via relay from one or more of the plurality of MEMS.

19. A smart-dust information security and energy optimization process for an automated teller machine (ATM) capable of being used by a human comprising the steps of:
  providing an ATM, said ATM having a card reader, an internal antenna, a communication interface, an external housing, internal components, internal wiring/circuitry, and an external camera;
  distributing, on the card reader, the external housing, the internal components, and the internal wiring, a plurality of microelectromechanical systems (MEMS) each of which is less than 1 millimeter in size in any dimension, said plurality of MEMS capable of wirelessly communicating with one another and one-way wireless communication to the antenna, each of said plurality of MEMS having a battery, wireless transmitter, wireless receiver, processor, memory, an analog-to-digital converter, and sensors interoperable together, said plurality of sensors including: LIDAR, photo detector, vibration detector, motion detector, a wireless signal detector for detecting Bluetooth or RFID signals, a temperature sensor, a humidity sensor, a power consumption sensor, a piezoelectric sensor, and a sound sensor;
  storing, in the battery in each of the plurality of MEMS, electrical energy received from a solar cell in each of the plurality of MEMS or received by electromagnetic induction from the internal wiring/circuitry;
  powering, by the battery, wireless transmitter, wireless receiver, processor, memory, an analog-to-digital converter, and the sensors;
  detecting, by the LIDAR, the photo detector, the vibration detector, the motion detector, the wireless signal detector, the temperature sensor, the humidity sensor, power consumption sensor, the piezoelectric sensor, and the sound sensor, sensed data;
  storing, in memory in the plurality of MEMS, the sensed data;
  transmitting, by a first transmitter in a first of said plurality of MEMS to both a second receiver in a second of said plurality of MEMS and to the antenna, the sensed data;
  relaying, by a second transmitter in the second of said plurality of MEMS to the antenna, the sensed data;
  receiving, by the antenna from the first transmitter or the second transmitter, the sensed data;
  generating, by the ATM, a consensus of the sensed data received from the plurality of MEMS in order to prevent erroneous interpretations if the sensed data is conflicting;
  determining, by the ATM based on the consensus, a human proximity for the human based on the LIDAR, the motion detector, the wireless signal detector, or the sound sensor;
  determining, by the ATM based on the consensus, malfunction indicia for any of said internal components or any of said internal wiring/circuitry based on the temperature sensor, the humidity sensor, the power consumption sensor, or the vibration sensor;
  determining, by the ATM based on the consensus, tamper indicia based on the power consumption sensor or the piezoelectric sensor;
  activating, based on the consensus, the ATM if the human proximity indicates human presence;
  hibernating, based on the consensus, the ATN if the human proximity indicates human absence;
  transmitting, by the communication interface based on the consensus, a component malfunction notification based on the malfunction indicia;
  transmitting, by the communication interface based on the consensus, a threat notification based on the tamper indicia;
  determining, by the ATM based on the consensus or a remote response to the component malfunction notification or the threat notification, whether to shut down the ATM; and
  capturing, by the camera in the ATM, a video image of the human in response to the threat indicia.

* * * * *